United States Patent [19]

Fisher

[11] 4,205,925
[45] Jun. 3, 1980

[54] UNIVERSAL JOINT OUTER SHELL

[75] Inventor: Leslie G. Fisher, Birmingham, England

[73] Assignee: GKN Transmissions Limited, Birmingham, England

[21] Appl. No.: 15,279

[22] Filed: Feb. 26, 1979

[30] Foreign Application Priority Data

Mar. 3, 1978 [GB] United Kingdom ................. 8646/78

[51] Int. Cl.$^2$ .............................................. F16D 3/00
[52] U.S. Cl. ...................................... 403/57; 403/284; 64/21
[58] Field of Search ................. 403/370, 371, 284, 57, 403/58, 285, 74; 64/21

[56] References Cited

U.S. PATENT DOCUMENTS

| 1,797,691 | 3/1931 | Merrill | 403/284 X |
| 2,380,952 | 8/1945 | Dewey | 403/285 X |
| 3,572,779 | 3/1971 | Dawson | 403/285 X |
| 3,633,951 | 1/1972 | Hinkle et al. | 403/284 X |
| 3,656,318 | 8/1972 | Smith et al. | 64/21 |
| 3,688,521 | 9/1972 | Smith et al. | 64/21 |

*Primary Examiner*—Wayne L. Shedd
*Attorney, Agent, or Firm*—Merriam, Marshall & Bicknell

[57] ABSTRACT

An outer member for a universal joint with torque transmission by balls engaged in grooves in the outer member, comprising a first component of a lightweight material for attachment to a transmission shaft, a second component fitting closely within the first component and defining the grooves, the first and second components being keyed against relative rotation and retained together by deformation of the first component.

4 Claims, 4 Drawing Figures

UNIVERSAL JOINT OUTER SHELL

BACKGROUND TO THE INVENTION

Field of the Invention

This invention relates to a universal joint of the kind comprising an outer joint member affording a cavity in which is disposed an inner joint member, the inner and outer joint members being formed with axially extending opposed pairs of grooves in each of which pairs of grooves is received a torque transmitting element such as a ball to provide for torque transmission between the inner and outer joint members whilst accomodating relative angular displacement between the rotational axis thereof. Such a joint will hereafter be referred to as a joint of the kind specified.

It is the object of the present invention to provide an improved construction of outer member for a joint of the kind specified, which is of relatively light weight compared with an all steel outer member which has been the construction most commonly adopted hitherto.

SUMMARY OF THE INVENTION

According to the invention, we provide a method of making an outer member for a joint of the kind specified, comprising providing a first component of a light-weight material and of generally tubular form defining an internal cavity, providing a second component with an outer wall which fits closely within the first component and an inner wall provided with the torque transmitting element receiving grooves of the joint, the first and second components being provided with formations engagable with one another to provide a mechanical key for torque transmission between the components, inserting said second component in said first component and engaging said keying formations thereof, and deforming said first component to retain said second component therein.

A suitable material for the second component of the joint member is a grade of steel such as has been used for joint outer members hitherto, and a suitable material for the first component is an aluminium alloy. By such a construction, an outer joint member lighter than one made entirely of steel is achieved.

According to a further aspect of the invention, we provide an outer joint member for a joint of the kind specified, comprising a first component formed of a lightweight material and affording an internal cavity, a second component fitting closely within said first component and having an inner wall provided with the torque transmitting element receiving grooves of the joint, inter-engaging keying formations on the first and second components preventing relative angular movement therebetween, and a deformed portion of the first component retaining the second component therein.

BRIEF DESCRIPTION OF DRAWINGS

The invention will now be described by way of example with reference to the accompanying drawings, of which

DESCRIPTION OF PREFERRED EMBODIMENTS

Figure 1:
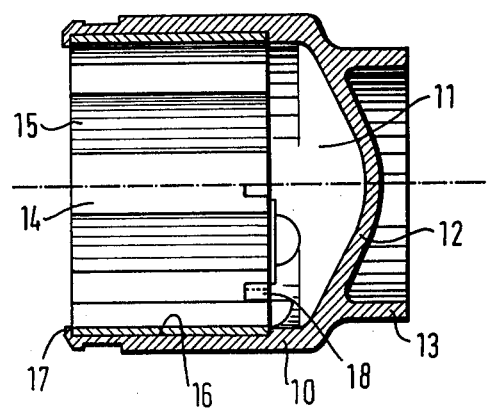
FIG. 1 is a longitudinal section through one form of outer member for a joint of the kind specified, embodying the invention
Figure 2:
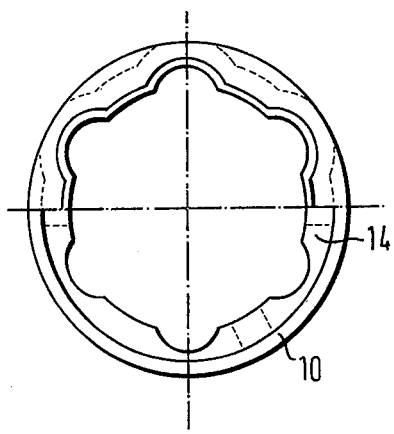
FIG. 2 is an end view of the joint member of FIG. 1

Referring firstly to FIGS. 1 and 2, the joint outer member there illustrated comprises a first component 10 formed of an aluminium alloy and being of generally cup-like configuration with an interior cavity 11. The component 10 terminates in a web portion 12 which closes off the end of the cavity 11, and a tubular spigot portion 13 by means of which the component 10 may be secured, e.g. by friction welding, to a transmission shaft.

Within the cavity of the component 10 there is disposed a second component 14 which is of generally tubular form, the inner wall thereof being formed with longitudinally extending grooves 15 for the reception of torque transmitting balls of the universal joint. The outer wall of the component 14 is either cylindrical, as shown in the lower half of FIG. 2, or of a shape which conforms to the shape of its inner wall, as shown in the upper half of FIG. 2. The second component 14 fits closely within the first component, the latter having an internal wall portion 16 which is either cylindrical, if the second component has a cylindrical outer wall, or formed with grooves if the second component has an outer wall of this form. The second component is secured within the first component by the spinning over of a lip 17 at the free end of the first component to extend over the edge of the second component, subsequent to insertion of the second component into the first component.

In the case where the outer wall of the second component 14 conforms to the shape of its inner wall, i.e. is provided with ridges corresponding to the ball receiving grooves, torque transmission between the first and second components is ensured by the shapes of their contacting surfaces. In the case where the outer wall of the second component 14 is cylindrical, however, this component must be provided with a keying formation in the form of a notch 18 or series of such notches in which engages a peg or series thereof provided within the first component 10.

Figure 3:
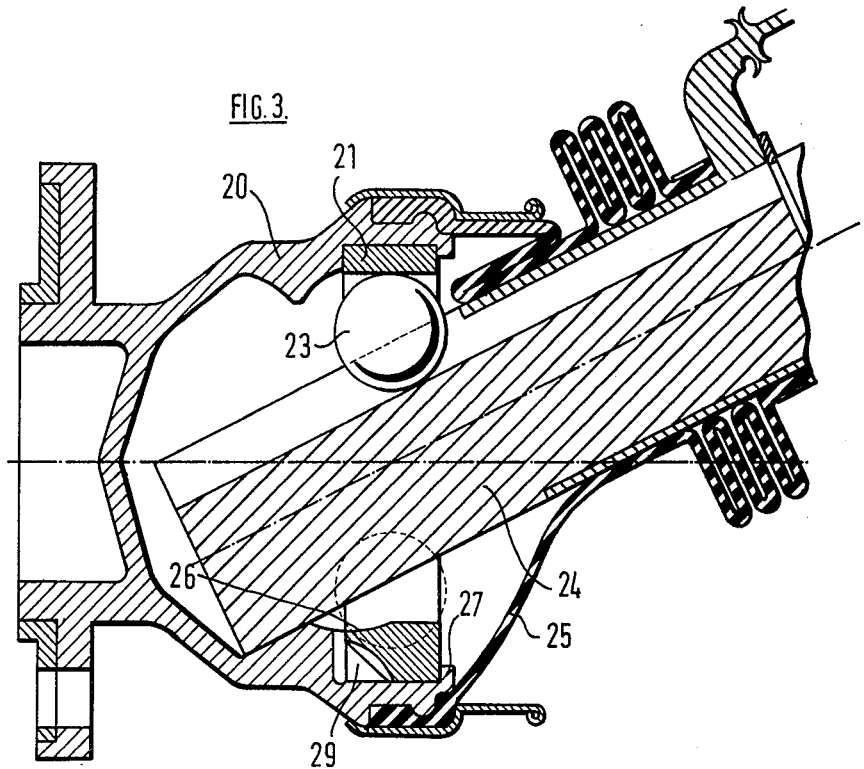
FIG. 3 is a longitudinal section through a further embodiment of joint of the kind specified having an outer member according to the invention
Figure 4:
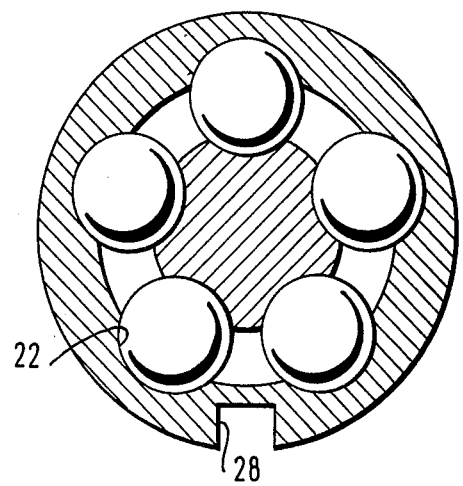
FIG. 4 is an end view of the outer member of the joint of FIG. 3.

Referring now to FIGS. 3 and 4 of the drawings, there is shown a further type of universal joint of the kind specified which includes an outer member according to the invention. This joint comprises an outer member with a first, aluminium alloy, component 20 and second, steel, component 21. The compound 21 is formed with relatively short grooves 22 which receive torque transmitting balls 23, and an inner joint member 24 is provided with long axially extending grooves. In this joint, plunge, i.e. relative axial movement between the inner and outer joint members, is accomodated by the balls rolling along the grooves in the inner joint member rather than along the grooves of the outer joint member as is the case in the joint of FIGS. 1 and 2. A ball cage and means for ensuring the balls occupy the bisector plane when the joint is in use, would also be provided, but are not shown in the drawings. The first and second components 20, 21 together define a part spherical surface 26 which co-operates with the ball cage to perform this guiding function. The joint is sealed by a flexible sealing boot 25, secured in conventional manner.

The second component 21 has a cylindrical outer wall which fits closely within a corresponding cylindrical inwardly presented surface of the first component 20. The second component is secured in position in the first component, subsequent to its insertion, by the inward deflection, e.g. by spinning, of a lip 27 provided at the free end of the first component. Angular movement of the second component within the first component is prevented by a notch 28 in the former which engages with a protuberance 29 provided in the latter.

The notch formed in the steel component may be provided with sharp edges adapted to remove metal from the protuberance provided in the first component in order to ensure a tight, and free of possible back-lash, engagement between these components. In this form of joint, as for the first form of joint described, a plurality of such notches may be provided.

The invention thus provides a lightweight joint outer member since the major part of the member is of the relatively lightweight aluminium alloy, whilst the parts of the outer member subject to wear are of a wear-resisting material, i.e. steel.

I claim:

1. A universal joint outer member, defining an internal cavity with axially extending grooves in the wall thereof for receiving balls for torque transmission with an inner joint member disposed within said cavity, comprising a first component of a lightweight material and including a part for attachment to a transmission shaft, a second component fitting closely within said first component and having an inner wall defining said grooves, inter-engaging keying formations on the first and second components for preventing relative angular movement therebetween, and a portion of said first component retaining said second component therein such portion having been deformed subsequent to assembly of the joint member to effect such retention.

2. A universal joint outer member according to claim 1 wherein said first component affords a cylindrical internal wall and said second component a cylindrical external wall which fits closely therein, said inter-engaging formations comprising at least one projection on the first component engaging in at least one recess in the second component.

3. A universal joint outer member according to claim 1 wherein said second component has an external wall of substantially the same shape as its inner wall and said first component affords an internal wall conforming to said external wall.

4. A universal joint outer member according to claim 1 wherein said second component is of steel and said first component is of an aluminium alloy.

* * * * *